US012585207B2

(12) United States Patent
Kajihara et al.

(10) Patent No.: US 12,585,207 B2
(45) Date of Patent: Mar. 24, 2026

(54) TONER

(71) Applicant: CANON KABUSHIKI KAISHA, Tokyo (JP)

(72) Inventors: Hisasuke Kajihara, Ibaraki (JP); Maki Imura, Kanagawa (JP); Kentaro Kamae, Kanagawa (JP); Yuu Nishimura, Chiba (JP); Takaho Shibata, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 450 days.

(21) Appl. No.: 18/183,368

(22) Filed: Mar. 14, 2023

(65) Prior Publication Data

US 2023/0314973 A1 Oct. 5, 2023

(30) Foreign Application Priority Data

Mar. 30, 2022 (JP) ................................ 2022-057354
Feb. 28, 2023 (JP) ................................ 2023-029193

(51) Int. Cl.
*G03G 9/09* (2006.01)
*G03G 9/08* (2006.01)
*G03G 9/087* (2006.01)

(52) U.S. Cl.
CPC ....... *G03G 9/08755* (2013.01); *G03G 9/0806* (2013.01)

(58) Field of Classification Search
CPC ... G03G 9/0821; G03G 9/08755; G03G 9/092
See application file for complete search history.

(56) References Cited

U.S. PATENT DOCUMENTS 7,833,687 B2 11/2010 Kato
8,084,174 B2 12/2011 Hasegawa
8,323,726 B2 12/2012 Naka
8,697,327 B2 4/2014 Shibata
8,921,023 B2 12/2014 Baba
8,927,188 B2 1/2015 Naka
8,974,994 B2 3/2015 Kamae
8,986,914 B2 3/2015 Fujikawa
9,057,970 B2 6/2015 Ida
9,058,924 B2 6/2015 Komatsu
9,063,443 B2 6/2015 Ishigami
9,348,247 B2 5/2016 Ida
9,540,483 B2 1/2017 Ida
9,665,023 B2 5/2017 Kamae
9,696,644 B2 7/2017 Ida
9,897,934 B2 2/2018 Tamura
9,915,885 B2 3/2018 Katsumata
9,969,834 B2 5/2018 Ohtsu
10,012,918 B2 7/2018 Ishigami
10,012,920 B2 7/2018 Shibata
10,012,921 B2 7/2018 Kamae
10,078,281 B2 9/2018 Ida
10,088,765 B2 10/2018 Miyakai
10,133,201 B2 11/2018 Kamae
10,203,619 B2 2/2019 Yamashita
10,216,108 B2 2/2019 Iwasaki
10,228,629 B2 3/2019 Tamura
10,234,777 B2 3/2019 Ohtsu
10,353,312 B2 7/2019 Kamae
10,423,090 B2 9/2019 Ohtsu
10,451,990 B2 10/2019 Kamae
10,514,624 B2 12/2019 Tamura
10,656,545 B2 5/2020 Kamae
10,775,710 B1 9/2020 Kamae
10,859,931 B2 12/2020 Hashimoto
10,877,386 B2 12/2020 Murayama
10,969,705 B2 4/2021 Shirayama
11,131,938 B2 9/2021 Murayama
11,429,032 B2 8/2022 Shibata
11,624,986 B2 4/2023 Kanno
11,662,670 B2 5/2023 Hama
(Continued)

FOREIGN PATENT DOCUMENTS

JP 7-234543 A 9/1995
JP 2019-194682 A 11/2019
JP 2021-043415 * 3/2021 ............. G03G 9/097

OTHER PUBLICATIONS

Translation of JP 2021-043415.*
(Continued)

*Primary Examiner* — Peter L Vajda
(74) *Attorney, Agent, or Firm* — VENABLE LLP

(57) ABSTRACT

The toner comprises a toner particle that contains a binder resin, a polymer C, and a pigment, wherein at least a portion of the polymer C is bonded with at least a portion of the pigment; in solid-state NMR measurement at 60° C. using as a sample, a solid fraction collected according to a prescribed procedure in which the toner is dissolved in chloroform, transverse relaxation time T2 of a peak observed at 1.5 ppm to 2.5 ppm is 1.0 ms to 50.0 ms; and using a $SP_A$ $(J/cm^3)^{0.5}$ for a SP value of the binder resin and a $SP_B$ $(J/cm^3)^{0.5}$ for a SP value of the polymer C, the $SP_A$ and the $SP_B$ satisfy a following formula (1).

$$1.0 \leq SP_A - SP_B \leq 2.4 \quad (1)$$

7 Claims, No Drawings

(56) References Cited

U.S. PATENT DOCUMENTS

| | | | | |
|---|---|---|---|---|
| 11,675,283 | B2 | 6/2023 | Kamae | |
| 2017/0102629 | A1* | 4/2017 | Moriya | G03G 9/08755 |
| 2017/0269493 | A1* | 9/2017 | Ohtsu | G03G 9/08726 |
| 2019/0339629 | A1 | 11/2019 | Yamashita | |
| 2021/0055668 | A1 | 2/2021 | Tamura | |
| 2021/0181647 | A1 | 6/2021 | Hashimoto | |
| 2021/0181651 | A1 | 6/2021 | Kanno | |
| 2021/0223710 | A1 | 7/2021 | Takahashi | |
| 2021/0278774 | A1 | 9/2021 | Hashimoto | |
| 2021/0278775 | A1 | 9/2021 | Kamae | |
| 2021/0286282 | A1 | 9/2021 | Kobori | |
| 2021/0302853 | A1 | 9/2021 | Murata | |
| 2021/0302854 | A1 | 9/2021 | Kitamura | |
| 2021/0397106 | A1 | 12/2021 | Kobori | |
| 2022/0050398 | A1 | 2/2022 | Ooyama | |
| 2022/0197163 | A1 | 6/2022 | Kajihara | |
| 2022/0197166 | A1 | 6/2022 | Chimoto | |
| 2022/0197174 | A1 | 6/2022 | Kajihara | |
| 2022/0342335 | A1 | 10/2022 | Ochi | |
| 2022/0373911 | A1 | 11/2022 | Kamae | |
| 2022/0373919 | A1 | 11/2022 | Imura | |

OTHER PUBLICATIONS

Fedors, Robert F., A Method for Estimating Both the Solubility Parameters and Molar Volumes of Liquids, Polymer Engineering and Science, Feb. 1974, vol. 14, No. 2, pp. 147-154.
U.S. Appl. No. 18/180,430, Maki Imura, filed Mar. 8, 2023.
U.S. Appl. No. 18/181,105, Nobuhiro Yoshida, filed Mar. 9, 2023.
U.S. Appl. No. 18/182,548, Kenta Mitsuiki, filed Mar. 13, 2023.
U.S. Appl. No. 18/185,422, Kentaro Kamae, filed Mar. 17, 2023.
U.S. Appl. No. 18/333,853, Maki Imura, filed Jun. 13, 2023.

* cited by examiner

TONER

BACKGROUND OF THE INVENTION

Field of the Invention

The present disclosure relates to the toner used in image-forming methods that employ an electrophotographic system.

Description of the Related Art

Electrophotographic system full-color copiers have in recent years become widespread, and their expansion into the print market is proceeding forward. An ability to accommodate diverse media and printing speeds is required in the print market. In addition, the glossiness required of the deliverables is diverse. Due to this, color stability for the deliverables is essential when the toner is fixed in a broader temperature region than heretofore. When toner is fixed in a broader temperature region than heretofore, depending on the temperature the state of the pigment dispersion in the toner can change at the time of fixing and the in-plane density uniformity, i.e., the color stability, can be impaired.

Stabilization of the dispersion of the pigment in the resin is required in order to suppress changes in the state of the pigment dispersion in the toner at the time of fixing. As prior art for achieving this dispersion stabilization, for example, Japanese Patent Application Laid-open No. H07-234543 proposes art in which a derivative of an organic colorant is used as a dispersion assistant during toner production.

SUMMARY OF THE INVENTION

However, while the art in this document does provide a certain effect on pigment re-aggregation at the time of fixing, the tinting strength can still be inadequate when the toner is fixed in a broader temperature region than heretofore. When the toner is fixed in a broader temperature region than heretofore, re-aggregation of the pigment in the toner occurs and the color of the deliverables can vary and the tinting strength ends up declining. In addition, even at a prescribed temperature, the pigment dispersibility can be inadequate, and the in-plane uniformity of the image density has been a problem.

In response to this, the present inventors investigated the use of pigment bonded to polymer that has the ability to disperse in the binder resin; however, it was found that the charge retention can be reduced.

The present disclosure provides a toner that exhibits an excellent tinting strength and an excellent in-plane density uniformity and that also exhibits an excellent charge retention.

The present disclosure relates to a toner comprising a toner particle comprising a binder resin, a polymer C, and a pigment, wherein:

at least a portion of the polymer C is bonded with at least a portion of the pigment;

in solid-state NMR measurement at 60° C. using a solid fraction collected according to a following (Procedure 1) for a sample, transverse relaxation time T2 of a peak observed at 1.5 ppm to 2.5 ppm is 1.0 ms to 50.0 ms; and using a $SP_A$ $(J/cm^3)^{0.5}$ for a SP value of the binder resin and a $SP_B$ $(J/cm^3)^{0.5}$ for a SP value of the polymer C, the $SP_A$ and the $SP_B$ satisfy a following formula (1).

$$1.0 \leq SP_A - SP_B \leq 2.4 \quad (1)$$

(Procedure 1)

A sucrose concentrate is prepared by adding 160 g of sucrose to 100 mL of deionized water and dissolving while heating on a water bath. A dispersion is prepared by introducing a following into a centrifugal separation tube: 31 g of the sucrose concentrate and 6 mL of a 10 mass % aqueous solution of a neutral pH 7 detergent for cleaning precision measurement instrumentation, comprising a nonionic surfactant, anionic surfactant, and organic builder. 2.0 g of the toner is added to the dispersion, and clumps of the toner are broken up using a spatula. The centrifugal separation tube is then shaken with a shaker. After shaking, a sediment is separated from the solution using a centrifugal separator and conditions of 3500 rpm, 30 minutes, and a rotation radius of 3 cm. A floating solid fraction is filtered with a vacuum filter and is then dried for at least 1 hour with a dryer to obtain a solid fraction. 1 g of the obtained solid fraction is dissolved in 20 mL chloroform; centrifugal separation is carried out for 180 minutes at 15000 rpm and a rotation radius of 3 cm; and a supernatant is discarded. Another 20 mL chloroform is added and the same process is repeated twice and a sediment is separated. The obtained sediment is filtered on the vacuum filter and a obtained solid fraction is dried for at least 5 hours in the dryer to obtain the sample.

The present disclosure can provide a toner that exhibits an excellent tinting strength and an excellent in-plane density uniformity and that also exhibits an excellent charge retention.

Further features of the present invention will become apparent from the following description of exemplary embodiments.

DESCRIPTION OF THE EMBODIMENTS

In the present disclosure, the expression of "from XX to YY" or "XX to YY" indicating a numerical range means a numerical range including a lower limit and an upper limit which are end points, unless otherwise specified. Also, when a numerical range is described in a stepwise manner, the upper and lower limits of each numerical range can be arbitrarily combined. Further, a monomer unit refers to the reacted form of the monomer substance in the polymer. Furthermore, a crystalline resin is a resin in which an endothermic peak is observed in differential scanning calorimetry (DSC).

In the present disclosure, tinting strength is defined as the image density with respect to the toner laid-on level on the paper. In addition, the charge retention is an index that shows how much of the toner charge quantity is retained—for example, after long-term standing in a high-temperature, high-humidity environment—of the toner charge quantity immediately after preparation of the developer using the produced toner.

The present disclosure relates to a toner comprising a toner particle comprising a binder resin, a polymer C, and a pigment, wherein:

at least a portion of the polymer C is bonded with at least a portion of the pigment;

in solid-state NMR measurement at 60° C. using a solid fraction collected according to a following (Procedure 1) for a sample, transverse relaxation time T2 of a peak observed at 1.5 ppm to 2.5 ppm is 1.0 ms to 50.0 ms; and using a $SP_A$ $(J/cm^3)^{0.5}$ for a SP value of the binder resin and a $SP_B$ $(J/cm^3)^{0.5}$ for a SP value of the polymer C, the $SP_A$ and the $SP_B$ satisfy a following formula (1).

$$1.0 \leq SP_A - SP_B \leq 2.4 \quad (1)$$

The present inventors carried out investigations into a toner that would exhibit an excellent tinting strength and an excellent in-plane density uniformity and that would also exhibit an excellent charge retention.

In order to inhibit reaggregation of the pigment in the toner during fixing and improve the tinting strength and in-plane density uniformity, the present inventors investigated the generation of bonding between the pigment and a polymer that readily engages in intimate mixing with the binder resin, in order to endow the pigment with dispersibility in the binder resin. It was found, however, that, depending on the polymer used, the affinity with the binder resin is high and the molecular mobility of the polymer ends up being excessively high and the charge retention of the toner ends up being reduced.

The present inventors then discovered that an excellent tinting strength and in-plane density uniformity and also an excellent charge retention can be provided by controlling the molecular mobility of the polymer-bonded pigment in combination with controlling the affinity between the polymer and binder resin into a prescribed range.

In a solid-state NMR measurement at 60° C. using a solid fraction collected from the toner according to the following (Procedure 1) for the sample, the transverse relaxation time T2 of the peak observed at 1.5 ppm to 2.5 ppm must be 1.0 ms to 50.0 ms. (Procedure 1) is as follows.

Procedure 1

A sucrose concentrate is prepared by the addition of 160 g of sucrose to 100 mL of deionized water and dissolving while heating on a water bath. A dispersion is prepared by introducing the following into a centrifugal separation tube: 31 g of the sucrose concentrate and 6 mL of a 10 mass % aqueous solution of a neutral pH 7 detergent for cleaning precision measurement instrumentation, including a nonionic surfactant, anionic surfactant, and organic builder. 2.0 g of the toner is added to this dispersion, and clumps of the toner are broken up using, for example, a spatula. The centrifugal separation tube is then shaken with a shaker. After shaking, sediment is separated from the solution using a centrifugal separator and conditions of 3500 rpm, 30 minutes, and a rotation radius of 3 cm. The floating solid fraction is filtered with a vacuum filter and is then dried for at least 1 hour with a dryer to obtain a solid fraction. 1 g of the obtained solid fraction is dissolved in 20 mL chloroform; centrifugal separation is carried out for 180 minutes at 15000 rpm and a rotation radius of 3 cm; and the supernatant is discarded. Another 20 mL chloroform is added and the same process is repeated twice and the sediment is separated. The obtained sediment is filtered on a vacuum filter and the obtained solid fraction is dried for at least 5 hours in a dryer to obtain the sample.

Contaminon N (Wako Pure Chemical Industries, Ltd.) is an example of the neutral pH 7 detergent for cleaning precision measurement instrumentation, including a nonionic surfactant, anionic surfactant, and organic builder. Contaminon N is a 10 mass % aqueous solution of a neutral pH 7 detergent for cleaning precision measurement instrumentation, including a nonionic surfactant, anionic surfactant, and organic builder.

A YS-LD from Yayoi Co., Ltd. is used as the shaker, and shaking is performed using conditions of 200 rpm and 1 minute.

A Front Lab FLD2012 (AS ONE Corporation) is used for the centrifugal separator.

The pigment contained in the toner and a resin component (a portion of the binder resin and the polymer C) made insoluble in chloroform due to bonding to the pigment are recovered by (Procedure 1) as the sample. In solid-state NMR measurement at 60° C. using as the sample the solid fraction recovered by (Procedure 1), the transverse relaxation time T2 of the peak observed at 1.5 ppm to 2.5 ppm is 1.0 ms to 50.0 ms.

This peak observed at 1.5 ppm to 2.5 ppm reflects the mobility of the hydrogen atoms assigned to the alkyl groups of the resin component. The fact that a resin having alkyl groups with a transverse relaxation time T2 in the aforementioned range is bonded to the pigment suggests that the molecular mobility of the resin-bonded pigment is suitably high.

When this transverse relaxation time T2 is less than 1.0 ms, the molecular mobility of the resin is quite low and movement of the resin-bonded pigment in the toner particle is then impaired. As a consequence, the pigment dispersion post-fixing is reduced, the tinting strength is reduced, and the generation of in-plane density non-uniformity is facilitated.

When, on the other hand, this transverse relaxation time T2 exceeds 50.0 ms, the molecular mobility of the resin is then excessively high, and as a consequence charge leakage in the charged toner is promoted and a decline in charge retention is facilitated.

Methods for obtaining a solid fraction having such a transverse relaxation time can be exemplified by a method in which the pigment and resin are kneaded under strong shear and the mechanoradicals produced in the resin bond to the pigment surface. The resin can bond to the pigment surface due to the generation of mechanoradicals in the resin that has been pulverized by impact during high-speed mixing of the pigment and resin.

For example, the transverse relaxation time T2 tends to be smaller when the resin has an entangled molecular structure, such as an amorphous resin. In addition, the transverse relaxation time T2 tends to be larger when the resin has an ordered molecular structure, such as a crystalline resin.

This transverse relaxation time T2 is preferably 3.0 ms to 30.0 ms, more preferably 4.0 ms to 20.0 ms, and still more preferably 10.0 ms to 15.0 ms. An excellent image density, in-plane density uniformity, and charge retention are exhibited when these ranges are observed.

The resin content in the solid fraction collected by (Procedure 1), per 100 mass parts of the pigment, is preferably 3 mass parts to 50 mass parts.

By being in this range, while allowing for charge leakage, the resin can bond to the pigment to produce a satisfactory steric repulsion between the pigment particles, and the image in-plane density uniformity, tinting strength, and charge retention can be further improved. The numerical value of the relaxation time T2 provided by solid-state NMR measurement is thought to be related to the mobility of the resin that is bonded to the pigment.

The resin-to-pigment ratio can be controlled, for example, using the molecular weight and amount of addition of the resin, e.g., the polymer C.

The resin content in the solid fraction collected using Procedure 1, expressed per 100 mass parts of the pigment, is more preferably 4 mass parts to 20 mass parts and still more preferably 5 mass parts to 10 mass parts. Of the resin contained in the solid fraction collected using Procedure 1, the content of the polymer C is preferably at least 50 mass %, or at least 60 mass %, or at least 70 mass %, or at least 80 mass %. The upper limit, while not being particularly restricted, is preferably equal to or less than 100 mass %, or equal to or less than 98 mass %, or equal to or less than 95 mass %.

In addition, using $SP_A$ $(J/cm^3)^{0.5}$ for the SP value of the binder resin and $SP_B$ $(J/cm^3)^{0.5}$ for the SP value of the polymer C, $SP_A$ and $SP_B$ satisfy the following formula (1).

$$1.0 \leq SP_A - SP_B \leq 2.4 \quad (1)$$

By having $SP_A - SP_B$ be in the indicated range, compatibility between the binder resin and polymer C is suitably facilitated and an excellent dispersibility is provided for the polymer C-bonded pigment in the toner particle. An excellent tinting strength and an excellent charge retention are provided as a result.

When $SP_A - SP_B$ is less than 1.0, there is a high level of affinity between the binder resin and the polymer C. In particular, due to the use of the polymer C, which has a relatively high molecular mobility for which the transverse relaxation time T2 is in the aforementioned range, the molecular mobility of the polymer C-bonded pigment in the binder resin ends up being excessively high and a decline in the charge retention is facilitated. When, on the other hand, $SP_A - SP_B$ exceeds 2.4, the compatibility of polymer C with the binder resin is impaired and the occurrence of aggregation of the polymer C-bonded pigment is facilitated. This results in a decline in the tinting strength.

$SP_A - SP_B$ is preferably 1.2 to 2.0, more preferably 1.5 to 1.9, and still more preferably 1.6 to 1.8.

The Binder Resin

The toner particle contains a binder resin. Known resins may be used for the binder resin, and specifically, for example, the following polymers may be used.

Styrene and homopolymers of substitution products thereof such as polystyrene, poly-p-chlorostyrene, polyvinyl toluene, and the like; Styrene-based copolymers such as styrene-p-chlorostyrene copolymer, styrene-vinyl toluene copolymer, styrene-vinyl naphthalin copolymer, styrene-acrylic acid ester copolymers, styrene-methacrylic acid ester copolymers, styrene-a-methyl chloromethacrylate copolymers, styrene-acrylonitrile copolymers, styrene-vinyl methyl ether copolymers, styrene-vinyl ethyl ether copolymers, styrene-vinyl methyl ketone copolymers and styrene-acrylonitrile-indene copolymers; polyvinyl chloride, phenolic resins, natural resin-modified phenolic resins, natural resin-modified maleic acid resins, acrylic resins, methacrylic resins, polyvinyl acetate, silicone resins, polyester resins, polyurethane resins, polyamide resins, furan resins, epoxy resins, xylene resins, polyvinyl butyral, terpene resins, coumarone-indene resins, petroleum-based resins and the like. These resins may be used singly as one type, or concomitantly as two or more types thereof.

From among the preceding, the binder resin preferably contains a polyester resin and more preferably contains an amorphous polyester resin and even more preferably is an amorphous polyester resin.

A polyhydric alcohol (dihydric or at least trihydric alcohol) and a polybasic carboxylic acid (dibasic or at least tribasic carboxylic acid) or an anhydride or lower alkyl ester thereof are used in the polyester resin. The amorphous polyester resin is preferably the condensation polymer of a polyhydric alcohol (dihydric or at least trihydric alcohol) and a polybasic carboxylic acid.

The binder resin preferably has, as a monomer unit that forms the skeleton of the amorphous polyester resin, a monomer unit provided by a straight-chain aliphatic polyhydric alcohol al having 2 to 10 carbons (preferably 2 to 6 carbons, more preferably 2 to 4 carbons, still more preferably 2 or 3 carbons, and even more preferably 2 carbons).

As the polyhydric alcohol monomer, the following polyhydric alcohol monomers can be used.

Dihydric alcohol components, for example, ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, hydrogenated bisphenol A, and also bisphenol represented by formula (A) and derivatives thereof;

(A)

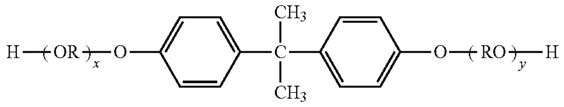

(In the formula, R is an ethylene group or a propylene group, x and y are each integers of 0 or more, and the average value of x+y is from 0 to 10.)

Diols represented by formula (B).

(B)

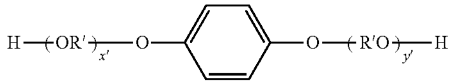

(In the formula, R' is

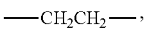

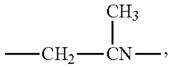

or

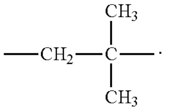

x' and y' are each integers of 0 or more, and the average value of x'+y' is from 0 to 10)

Examples of trihydric or higher alcohol components include sorbitol, 1,2,3,6-hexanetetrol, 1,4-sorbitan, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-trihydroxymethylbenzene. Among these, glycerol, trimethylolpropane, and pentaerythritol are preferably used. These dihydric alcohols and trihydric or higher alcohols can be used alone or in combination.

The following polyvalent carboxylic acid monomers can be used as the polyvalent carboxylic acid monomer of the polyester resin.

Examples of divalent carboxylic acid components include maleic acid, fumaric acid, citraconic acid, itaconic acid, glutaconic acid, phthalic acid, isophthalic acid, terephthalic acid, succinic acid, adipic acid, sebacic acid, azelaic acid, malonic acid, n-dodecenylsuccinic acid, isododecenylsuccinic acid, n-dodecyl succinic acid, isododecylsuccinic acid, n-octenylsuccinic acid, n-octylsuccinic acid, isooctenylsuccinic acid, isooctylsuccinic acid, anhydrides of these acids and lower alkyl esters thereof. Among these, maleic acid, fumaric acid, terephthalic acid and n-dodecenylsuccinic acid are preferably used.

Examples of trivalent or higher carboxylic acids, acid anhydrides thereof and lower alkyl esters thereof include 1,2,4-benzenetricarboxylic acid, 2,5,7-naphthalenetricarboxylic acid, 1,2,4-naphthalenetricarboxylic acid, 1,2,4-butanetricarboxylic acid, 1,2,5-hexanetricarboxylic acid, 1,3-dicarboxyl-2-methyl-2-methylenecarboxypropane, 1,2,4-cyclohexanetricarboxylic acid, tetra(methylenecarboxyl) methane, 1,2,7,8-octanetetracarboxylic acid, pyromellitic acid, Empol trimer acid, acid anhydrides thereof and lower alkyl esters thereof.

Of these, 1,2,4-benzenetricarboxylic acid, that is, trimellitic acid, or a derivative thereof is particularly preferred because of low cost and easy reaction control. These divalent carboxylic acids and the like and trivalent or higher carboxylic acids can be used alone or in combination.

From the standpoint of pigment dispersibility, the binder resin preferably has, as a monomer unit that forms the skeleton of the amorphous polyester resin, a monomer unit provided by a straight-chain aliphatic polyhydric alcohol al having 2 to 10 carbons. The straight-chain aliphatic polyhydric alcohol al having 2 to 10 carbons can be exemplified by ethylene glycol, propanediol, butanediol, pentanediol, hexanediol, heptanediol, octanediol, nonanediol, and decanediol.

Due to the monomer unit provided by the alcohol al, mechanoradicals produced in the binder resin when the pigment is kneaded under strong shear with the binder resin readily bond to the pigment surface. Steric repulsion is produced between the pigment particles by this. As a consequence, the pigment dispersibility can be enhanced and the tinting strength can be further improved.

The binder resin is preferably a condensation polymer of the straight-chain aliphatic polyhydric alcohol al with a dibasic carboxylic acid component. The content in the polyester resin of the monomer unit provided by the straight-chain aliphatic polyhydric alcohol al is preferably 20.0 to 60.0 mass % and more preferably 25.0 to 40.0 mass %. The content in the binder resin of the monomer unit provided by the dibasic carboxylic acid component is preferably 40.0 to 80.0 mass % and more preferably 60.0 to 75.0 mass %. The dibasic carboxylic acid component preferably contains terephthalic acid and more preferably is terephthalic acid.

A method for producing the polyester is not particularly limited, and known methods can be used. For example, a polyester resin is produced by charging the above alcohol monomer and carboxylic acid monomer at the same time and performing polymerization through an esterification reaction or a transesterification reaction, and a condensation reaction. Moreover, the polymerization temperature is not particularly limited, but is preferably in the range of from 180° C. to 290° C. A polymerization catalyst such as a titanium-based catalyst, a tin-based catalyst, zinc acetate, antimony trioxide, germanium dioxide, and the like can be used in the polymerization of the polyester. In particular, the polyester resin is more preferably a polyester resin polymerized using a tin-based catalyst.

$SP_A$ $(J/cm^3)^{0.5}$, which is the SP value of the binder resin, is preferably 10.3 to 12.0, more preferably 10.6 to 11.7, and still more preferably 11.0 to 11.5.

The acid value of the binder resin is preferably 0.5 to 30.0 mg KOH/g, more preferably 2.0 to 20.0 mg KOH/g, and still more preferably 6.0 to 10.0 mg KOH/g. A better charge retention is obtained in this range.

The Polymer C

A known polymer can be used for the polymer C, and, for example, the following polymers can be used:

homopolymers of styrene and its substituted forms, e.g., polystyrene, poly-p-chlorostyrene, and polyvinyltoluene; styrene copolymers, e.g., styrene-p-chlorostyrene copolymer, styrene-vinyltoluene copolymer, styrene-vinylnaphthalene copolymer, styrene-acrylate ester copolymer, styrene-methacrylate ester copolymer, styrene-methyl a-chloromethacrylate copolymer, styrene-acrylonitrile copolymer, styrene-vinyl methyl ether copolymer, styrene-vinyl ethyl ether copolymer, styrene-vinyl methyl ketone copolymer, and styrene-acrylonitrile-indene copolymer; as well as polyvinyl chloride, phenolic resins, natural resin-modified phenolic resins, natural resin-modified maleic acid resins, acrylic resins, methacrylic resins, polyvinyl acetate, silicone resins, polyester resins, polyurethane resins, polyamide resins, furan resins, epoxy resins, xylene resins, polyvinyl butyral, terpene resins, coumarone-indene resins, and petroleum resins. A single one of these resins may be used by itself or two or more may be used in combination.

The polymer C preferably contains a polyester resin and more preferably contains a crystalline polyester resin and still more preferably is a crystalline polyester resin. The crystalline polyester resin is preferably a condensation polymer of alcohol containing C2 to C23 aliphatic diol with carboxylic acid containing C3 to C24 aliphatic dicarboxylic acid. The crystalline polyester resin is more preferably a condensation polymer of alcohol containing a C2 to C10 (preferably C2 to C6, more preferably C2 to C4, still more preferably C2 or C3, and even more preferably C2) straight-chain aliphatic polyhydric alcohol cl with carboxylic acid containing a C9 to C17 (preferably C10 to C14) aliphatic dicarboxylic acid.

From the standpoint of pigment dispersibility, the polymer C preferably has, as a monomer unit that forms the skeleton of the crystalline polyester resin, a monomer unit provided by the C2 to C10 straight-chain aliphatic polyhydric alcohol cl. The use of the alcohol cl having the indicated number of carbons facilitates bonding by the mechanoradicals produced in the polymer C to the pigment surface when the pigment and the polymer C are kneaded under strong shear. This results in the generation of steric repulsion between the organic pigment particles. As a consequence, the pigment dispersibility can be improved and the tinting strength can be enhanced.

In addition, the absolute value of the difference in the amorphous polyester resin between the number of carbons in the straight-chain aliphatic polyhydric alcohol al and the number of carbons in the straight-chain aliphatic polyhydric alcohol cl, is preferably not greater than 4, more preferably not greater than 2, still more preferably not greater than 1, and even more preferably is 0. When the difference in the number of carbons is in the indicated range, compatibility between the binder resin and the polymer C is facilitated and the pigment dispersibility and tinting strength are further enhanced.

The aliphatic diol is preferably a straight-chain diol and can be exemplified by 1,4-butanediol, 1,5-pentanediol, 1,6-hexanediol, 1,7-heptanediol, 1,8-octanediol, 1,9-nonanediol, 1,10-decanediol, 1,12-dodecanediol, and their derivatives. The derivatives may be derivatives that provide the same resin structure by condensation polymerization, but are not otherwise particularly limited. An example is a derivative provided by the esterification of the indicated diol.

The aliphatic dicarboxylic acid is preferably a straight-chain aliphatic dicarboxylic acid and can be exemplified by malonic acid, succinic acid, glutaric acid, adipic acid, pimelic acid, suberic acid, glutaconic acid, azelaic acid, sebacic acid, hexadecanedioic acid, eicosanedioic acid, and their derivatives. The derivatives may be derivatives that provide the same resin structure by condensation polymerization, but are not otherwise particularly limited. Examples here are the anhydrides of the dicarboxylic acids, derivatives provided by conversion of the dicarboxylic acid component into an alkyl ester, and derivatives provided by conversion of the dicarboxylic acid component into the acid chloride.

On the other hand, a combination with a carboxylic acid other than an aliphatic dicarboxylic acid may also be used for the carboxylic acid.

The polymer C preferably contains polyester resin. In addition, the polymer C preferably has, as a monomer unit that forms the polyester skeleton, a monomer unit provided by an at least trihydric (preferably a trihydric) polyhydric alcohol. For example, the polymer C may have within the molecule a crosslinking segment provided by a monomer unit itself provided by an at least trihydric polyhydric alcohol.

The reason for this is that during, for example, melt kneading, active sites such as mechanoradicals are produced at crosslink sites provided by the at least trihydric polyhydric alcohol in the polymer C and bonding to the pigment is facilitated. As a consequence, steric repulsion between pigment particles is produced and the pigment dispersibility can be improved and the tinting strength can be further improved.

Thus, the crystalline polyester resin more preferably is the condensation polymer of carboxylic acid containing a C9 to C17 (preferably C10 to C14) aliphatic dicarboxylic acid, with alcohol containing a C2 to C10 straight-chain aliphatic polyhydric alcohol cl and an at least trihydric (preferably a trihydric) polyhydric alcohol.

The number of carbons in the at least trihydric (preferably a trihydric) polyhydric alcohol is preferably 2 to 10, more preferably 2 to 6, still more preferably 2 to 4, and is even more preferably 2.

Examples here are ethane-1,1,2-triol, 1,2,3-propanetriol, 1,2,4-butanetriol, 1,2,5-pentanetriol, 1,2,6-hexanetriol, 2-methylpropanetriol, and 2-methyl-1,2,4-butanetriol. A single one of these may be used or a combination of a plurality may be used.

The content of the polymer C in the toner particle is preferably 0.1 to 15.0 mass % and more preferably 1.0 to 10.0 mass %. In addition, the content of the polymer C, expressed per 100 mass parts of the binder resin, is preferably 2 to 22 mass parts, more preferably 4 to 15 mass parts, and still more preferably 5 to 10 mass parts.

In the toner particle, at least a portion of the polymer C is bonded with at least a portion of the pigment. This results in the formation of polymer C-bonded pigment. It is thought that when the polymer C is, for example, a polyester resin, the ester bond undergoes cleavage during melt kneading and bonds are formed in particular with aromatic rings in the colorant molecule. It is hypothesized that these bonds are formed by the following formula (I) or formula (II).

$$—Op—CO—X \tag{I}$$

($C_P$ is an oxygen atom that is bonded to any carbon atom in an aromatic ring in the colorant molecule. X is the polymer segment after the ester bond of the polymer C has been cleaved.)

$$—C_PH_2—Y \tag{II}$$

($C_P$ is a carbon atom bonded to any carbon atom in an aromatic ring constituting the colorant molecule. Y is the polymer segment after the ester bond of the polymer C has been cleaved.)

Steric repulsion is produced between pigment particles by the aforementioned polymer segment, and this has an effect on pigment dispersibility.

In particular, selective bonding to the pigment is facilitated when the polymer C is a crystalline polyester resin. The reason for this is that crystalline polyester resin has a lower SP value than amorphous polyester resin, which facilitates crystalline polyester resin being present in a state of greater miscibilization with the pigment than amorphous polyester resin. It is thought that as a result the radicals (active sites) deriving from crystalline polyester resin, which are produced during the application of high shear forces during melt kneading, more readily bond with the pigment than radicals that derive from amorphous polyester resin.

$SP_B$, which is the SP value $(J/cm^3)^{0.5}$ of the polymer C, preferably satisfies the following formula (2).

$$9.0 \leq SP_B \leq 10.0 \tag{2}$$

When this range is observed, a small difference between the SP values of the polymer C and the binder resin is easily achieved, the molecular mobility of the polymer C resides at a suitable level, and the tinting strength and in-plane density uniformity can be further enhanced. $SP_B$ is more preferably 9.2 to 9.9, still more preferably 9.4 to 9.8, and even more preferably 9.5 to 9.7.

The weight-average molecular weight Mw of the polymer C is preferably 6000 to 27000, more preferably 15000 to 25000, and still more preferably 16000 to 22000. When the indicated range is observed, steric repulsion is produced in the pigment by the polymer C bonded to the pigment and the tinting strength is further enhanced. In addition, pigment-to-pigment bridging aggregation via the polymer C is also suppressed and the tinting strength and in-plane density uniformity can be further enhanced.

Colorant

The toner particle contains a pigment. The pigment is preferably, for example, an organic pigment. Viewed from the standpoint of facilitating bonding with the polymer C, a pigment having an aromatic ring is preferred.

The toner particle may contain another colorant to the extent that the previously described effects are not impaired. The colorant can be exemplified by known organic pigments, oil dyes, carbon black, and magnetic bodies. Examples of the pigment and other colorants are provided below.

Cyan colorants can be exemplified by copper phthalocyanine compounds and derivatives thereof, anthraquinone compounds, and basic dye lake compounds. Specific examples are C. I. Pigment Blue 1, 7, 15, 15:1, 15:2, 15:3, 15:4, 60, 62, and 66.

Magenta colorants can be exemplified by condensed azo compounds, diketopyrrolopyrrole compounds, anthraquinone compounds, quinacridone compounds, basic dye lake compounds, naphthol compounds, benzimidazolone compounds, thioindigo compounds, and perylene compounds. Specific examples are as follows: C. I. Pigment Red 2, 3, 5, 6, 7, 23, 48:2, 48:3, 48:4, 57:1, 81:1, 122, 144, 146, 166, 169, 177, 184, 185, 202, 206, 220, 221, and 254, and C. I. Pigment Violet 19.

Yellow colorants can be exemplified by condensed azo compounds, isoindolinone compounds, anthraquinone compounds, azo-metal complexes, methine compounds, and allylamide compounds. Specific examples are as follows: C. I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 191, and 194.

Black colorants can be exemplified by carbon black and magnetic bodies and by black colorants provided by color mixing using the aforementioned yellow colorants, magenta colorants, and cyan colorants to give a black color. A single one of these colorants may be used by itself or a mixture of two or more may be used. These colorants may also be used in the form of solid solutions.

From the standpoint of the ease of bonding with the polymer C and the pigment dispersibility resulting from this, the pigment is preferably a magenta colorant, is more preferably a quinacridone pigment, and even more preferably is C. I. Pigment Red (PR)-122.

The content of the pigment, per 100 mass parts of the binder resin, is preferably from 1 mass parts to 25 mass parts and is more preferably from 5 mass parts to 15 mass parts.

The pigment preferably contains a quinacridone pigment.

The quinacridone pigment preferably has peaks corresponding to the pigment at 2 θ=5°±0.5°, 2 θ=14°±0.5°, 25°±0.5°, and 2 θ=27°±0.5° where θ is the Bragg angle and 2 θ is the diffraction angle.

The crystallite diameter D can be calculated from the peak at 2 θ=27°±0.5°. The crystallite diameter D is preferably 12 nm to 20 nm and is more preferably 14 nm to 18 nm. By having D be in the indicated range, the active sites on the pigment surface are present to a suitable degree and pigment-to-pigment aggregation can be suppressed and the tinting strength is further improved. In addition, bonding of the polymer C is facilitated and the in-plane density uniformity is also further improved.

The crystallite diameter D can be controlled, for example, by subjecting the pigment to a heat treatment, for example, by decreasing the amorphous phase and raising the crystallinity in a high-temperature, high-pressure environment.

In addition, the value of the ratio Mw/D of the weight-average molecular weight Mw of the polymer C to the crystallite diameter D (nm) preferably satisfies the following formula (3).

$$300.0 \leq Mw/D < 2000.0 \quad (3)$$

When Mw/D is in the indicated range, steric repulsion is produced within the pigment and the tinting strength is further improved. In addition, pigment-to-pigment bridging aggregation via the polymer C is also suppressed and the in-plane density uniformity can be further improved.

Mw/D is more preferably 900.0 to 1500.0, even more preferably 1000.0 to 1400.0, and still more preferably 1100.0 to 1300.0.

Release Agent

The toner particle may contain a release agent. This release agent can be exemplified by the following:

low-molecular-weight polyolefins, e.g., polyethylene; silicones that exhibit a melting point; fatty acid amides, e.g., oleamide, erucamide, ricinoleamide, and stearamide; ester waxes, e.g., stearyl stearate; plant waxes, e.g., carnauba wax, rice wax, candelilla wax, Japan wax, and jojoba oil; animal waxes, e.g., beeswax; mineral and petroleum waxes, e.g., montan wax, ozokerite, ceresin, paraffin wax, microcrystalline wax, Fischer-Tropsch waxes, and ester waxes; and modifications of the preceding.

A single one of these release agents may be used by itself or a mixture of two or more may be used. The content of the release agent is preferably 1 to 20 mass parts per 100 mass parts of the binder resin.

Toner Production Methods

Procedures for producing the toner will now be described. The method for producing the toner is not particularly limited, and a known method can be used, for example, an emulsion aggregation method, pulverization method, or suspension polymerization method. The toner particle is preferably a pulverized toner particle. The method for producing the toner preferably is a toner production method that includes the melt-kneading step described below.

Starting Material Mixing

In the starting material mixing step, the binder resin, polymer C, pigment, and so forth are metered out in prescribed quantities, blended, and mixed. The mixer is not particularly limited and can be exemplified by the following: Henschel mixer (Nippon Coke & Engineering Co., Ltd.); Supermixer (Kawata Mfg. Co., Ltd.); Ribocone (Okawara Corporation); Nauta mixer, Turbulizer, and Cyclomix (Hosokawa Micron Corporation); Spiral Pin Mixer (Pacific Machinery & Engineering Co., Ltd.); and Loedige Mixer (Matsubo Corporation). The mixture that has been mixed by the mixer is designated mixture 1.

Melt-Kneading Step

A toner starting material containing the mixture 1 is melt-kneaded using a twin-screw extruder. In the melt-kneading step, a batch kneader, e.g., a pressure kneader or Banbury mixer, or a continuous kneader can be used, and a single-screw or twin-screw extruder is preferred because this offers the advantage of enabling continuous production. The temperature during melt-kneading is preferably 100° C. to 200° C.

The melt-kneading apparatus is not particularly limited and can be exemplified by batch kneaders such as pressure kneaders and Banbury mixers, and by the Model TEM extruder (Toshiba Machine Co., Ltd.), TEX twin-screw kneader (The Japan Steel Works, Ltd.), PCM kneader (Ikegai Ironworks Corp.), and Kneadex (Mitsui Mining Co., Ltd.). A continuous kneader, i.e., a single-screw or twin-screw extruder, is preferred over a batch kneader because this offers the advantage, e.g., of enabling continuous production.

Pulverization Step

After the melt-kneading step, the obtained kneadate is cooled until a hardness is reached that enables pulverization, and mechanical pulverization is subsequently performed, using a known pulverizer, e.g., a collision plate-type jet mill, a fluidized bed jet mill, or a rotary mechanical mill, to provide a toner particle diameter. The use of a fluidized bed jet mill as the pulverizer is desirable from the standpoint of the pulverization efficiency.

The pulverizer can be exemplified by the following: Counter Jet Mill, Micron Jet, and Inomizer (Hosokawa Micron Corporation); IDS mill and PJM Jet Mill (Nippon Pneumatic Mfg. Co., Ltd.); Cross Jet Mill (Kurimoto, Ltd.); Ulmax (Nisso Engineering Co., Ltd.); SK Jet-O-Mill (Seishin Enterprise Co., Ltd.); Kryptron (Kawasaki Heavy Industries, Ltd.); Turbo Mill (Turbo Kogyo Co., Ltd.); and Super Rotor (Nisshin Engineering Inc.).

Classification Step

As necessary, the finely pulverized material yielded by the pulverization step may be classified to yield a toner particle having a desired particle size distribution.

A known apparatus, e.g., a wind force classifier, internal classifier, screen-type classifier, and so forth, can be used as the classifier used for classification. Specific examples are as follows: Classiel, Micron Classifier, and Spedic Classifier (Seishin Enterprise Co., Ltd.); Turbo Classifier (Nisshin Engineering Inc.); Micron Separator, Turboflex (ATP), and TSP Separator (Hosokawa Micron Corporation); Elbow Jet (Nittetsu Mining Co., Ltd.); Dispersion Separator (Nippon Pneumatic Mfg. Co., Ltd.); and YM Microcut (Yasukawa Shoji Co., Ltd.).

The toner particle produced according to the preceding steps may be used as such as a toner. Inorganic fine particles, e.g., silica, alumina, titania, and so forth, and/or resin fine particles, e.g., of a vinyl resin, polyester resin, silicone resin, and so forth, may optionally be added to the toner particle under the application of shear force in a dry state. These inorganic fine particles and resin fine particles function as an external additive, e.g., a flowability auxiliary agent, a cleaning auxiliary agent, and so forth.

The weight-average particle diameter of the toner is preferably from 3.0 μm to 20.0 μm and more preferably from 4.0 μm to 10.0 μm. The weight-average particle diameter can be measured using a "Coulter Counter Multisizer 3" (registered trademark, from Beckman Coulter, Inc.), a precision particle size distribution measurement instrument, and the accompanying dedicated software, i.e., "Beckman Coulter Multisizer 3 Version 3.51" (from Beckman Coulter, Inc.).

Method for confirming that the Polymer C and the Pigment are bonded to each other It can be confirmed that at least a portion of the polymer C and at least a portion of the pigment are bonded to each other by detecting the glass transition of the sample obtained in the Procedure 1 based on the heat flow data. For the detection of the glass transition, DSC Q2000 (manufactured by TA Instruments) is used. Alternatively, it can be confirmed that at least a portion of the polymer C and at least a portion of the pigment are bonded to each other by detecting the natural vibration according to the molecular structure of the polymer C by measuring the vibration spectrum by Fourier transform infrared spectroscopy. The vibration spectrum is measured by Fourier transform infrared spectroscopy using Nicolet iS5FT-IR (manufactured by ThermoFisher SCIENTIFIC).

Measurement of Transverse Relaxation Time T2

The transverse relaxation time T2 is measured, by solid-state NMR, as follows.

A sample of the solid fraction obtained in Procedure 1 described above is placed in a sample cell, and the sample is measured under the following conditions.

Device: JNM-ECA400-II by JEOL Ltd.

Probe: 4 mm MAS probe

Sample revolutions: 10 kHz

Measurement temperature: 60° C.

Measured nucleus: $^1H$ (proton)

Measurement range: 5±125 (ppm)

Pulse mode: spin echo mode 90-degree pulse width: 3.121 μsec 180-degree pulse width: 6.242 μsec Total echo time: 30 points at 0.3 μs, 0.45 μs, 0.69 μs, 1.04 μs, 1.58 μs, 2.38 μs, 3.61 μs, 5.46 μs, 8.27 μs, 12.52 μs, 18.96 μs, 28.7 μs, 43.44 μs, 65.76 μs, 99.54 μs, 150.69 μs, 228.11 μs, 345.31 μs, 522.72 μs, 791.28 μs, 1.19783 ms, 1.81326 ms, 2.74488 ms, 4.15516 ms, 6.29 ms, 9.5217 ms, 14.4138 ms, 21.819 ms, 33.03 ms and 50 ms.

Repetition interval: 5 sec

Number of repetitions: 8 repeats

Number of data points: 1024

The obtained results are subjected to regression analysis calculation using the analysis software "Delta" by JEOL Ltd. A peak between 1.0 ppm and 2.5 ppm is selected as the peak to be analyzed, and the obtained relaxation curve is fitted to $f(t)=f(0)\exp(-t/T2)$ in the analysis mode "Unweighted Linear Spin Lock mode", to work out the transverse relaxation time T2 (ms).

Mass Ratio of Resin to Pigment in the Solid Fraction obtained in Procedure 1

The solid fraction separated from the toner in Procedure 1 is measured using a thermogravimetric/differential thermal analyzer (by Rigaku Corporation, differential thermal balance TG-DTA, ThermoPlus TG8120). The temperature is raised from 25° C. to 400° C. at a rate of 10° C./min, and the adsorption amount of resin is measured on the basis of the change in weight.

Calculation of SP Values

The SP value is an abbreviation for solubility parameter and is a value that acts as an index for solubility. The SP value for the binder resin and the SP value for the polymer C are designated $SP_A$ and $SP_B$, respectively. $SP_A$ and $SP_B$ are calculated as follows according to the method of calculation proposed by Fedors.

For each of the binder resin and the polymer C, the energy of vaporization (Δei) (cal/mol) and the molar volume (Δvi) ($cm^3$/mol) are determined from the tables given in "Polym. Eng. Sci., 14(2), 147-154 (1974)" for the atoms or atomic groups in the molecular structure, and $(\Sigma\Delta ei/\Sigma\Delta vi)^{0.5}$ is used for the SP value $(cal/cm^3)^{0.5}$.

The unit for the SP value can be converted using 1 $(cal/cm^3)^{0.5}=2.045\times10^3\ (J/cm^3)^{0.5}$.

The energy of vaporization (Δei) (cal/mol) and the molar volume (Δvi) ($cm^3$/mol) of the monomer unit are first determined for each monomer unit, and the product with the molar ratio (j) for each monomer unit for the binder resin or the polymer C is calculated in each case. The sum total of the vaporization energy of each monomer unit and the sum total of the molar volume of each monomer unit are substituted into the following formula to calculate the respective SP values.

$$\text{SP value}=\{(\Sigma j\times\Sigma\Delta ei)/(\Sigma j\times\Sigma\Delta vi)\}^{0.5}$$

Measurement of the Acid Value

The acid value of a resin is the number of milligrams of potassium hydroxide required to neutralize the acid component, such as resin acids or free fatty acids, present in 1 g of a sample. The acid value is measured in accordance with JIS K 0070-1992, and specifically is measured using the following procedure.

(1) Reagent Preparation 1.0 g of phenolphthalein is dissolved in 90 mL of ethanol (95 volume %), and this is brought to 100 mL by the addition of deionized water to provide a phenolphthalein solution. 7 g of special-grade potassium hydroxide is dissolved in 5 mL of water and this is brought to 1 L by the addition of ethanol (95 volume %). This is introduced into an alkali-resistant container avoiding contact with, for example, carbon dioxide, and is allowed to stand for 3 days, after which time filtration is carried out to obtain a potassium hydroxide solution. The obtained potassium hydroxide solution is stored in an alkali-resistant container. The factor for this potassium hydroxide solution is determined from the amount of the potassium hydroxide solution required for neutralization when 25 mL of 0.1 mol/L hydrochloric acid is introduced into an Erlenmeyer flask, several drops of the phenolphthalein solution are added, and titration is performed using the potassium hydroxide solution. The 0.1 mol/L hydrochloric acid used is prepared in accordance with JIS K 8001-1998.

(2) Procedure (A) Main Test 2.0 g of the pulverized sample is exactly weighed into a 200-mL Erlenmeyer flask and 100 mL of a toluene/ethanol (2:1) mixed solution is added and dissolution is carried out over 5 hours. Several drops of the phenolphthalein solution are added as indicator and titration is performed using the potassium hydroxide solution. The titration endpoint is taken to be the persistence of the faint pink color of the indicator for approximately 30 seconds.

(B) Blank Test

The same titration as in the above procedure is run, but without using the sample (that is, with only the toluene/ethanol (2:1) mixed solution).

(3) The acid value is calculated by substituting the obtained results into the following formula.

$$A=[(C-B)\times f\times 5.61]/2.0$$

In this formula, A represents the acid value (mg KOH/g) of the resin; B represents the amount (mL) of addition of the potassium hydroxide solution in the blank test; C represents the amount (mL) of addition of the potassium hydroxide solution in the main test; and f is the factor for the potassium hydroxide solution.

Measurement of the Weight-Average Molecular Weight

The weight-average molecular weight (Mw) of the polymer C is measured using gel permeation chromatography (GPC) as follows.

First, the sample is dissolved in tetrahydrofuran (THF) at room temperature for 24 hours. The obtained solution is filtered using a "Sample Pretreatment Cartridge" (Tosoh Corporation) solvent-resistant membrane filter having a pore diameter of 0.2 μtm to obtain a sample solution. The sample solution is adjusted to a concentration of THF-soluble component of approximately 0.8 mass %. Measurement is carried out under the following conditions using this sample solution.

Instrument: HLC8120 GPC (detector: RI) (Tosoh Corporation)

Column: 7-column train of Shodex KF-801, 802, 803, 804, 805, 806, and 807 (Showa Denko Kabushiki Kaisha)

Eluent: tetrahydrofuran (THF)

Flow rate: 1.0 mL/min

Oven temperature: 40.0° C.

Sample injection amount: 0.10 mL

A molecular weight calibration curve constructed using polystyrene resin standards (for example, product name "TSK Standard Polystyrene F-850, F-450, F-288, F-128, F-80, F-40, F-20, F-10, F-4, F-2, F-1, A-5000, A-2500, A-1000, A-500", Tosoh Corporation) is used to determine the molecular weight of the sample.

Method for X-Ray Diffraction Measurement

The X-ray diffraction measurements use an "RINT-TTRII" (Rigaku Corporation) analyzer and the control software and analysis software provided with the instrument. The measurement conditions are as follows.

X-ray: Cu/50 kV/300 mA

Goniometer: rotor horizontal goniometer (TTR-2)

Attachment: standard sample holder

Divergence slit: open

Divergence vertical slit: 10.00 mm

Scattering slit: open

Light-receiving slit: open

Counter: scintillation counter

Scanning mode: continuous

Scanning speed: 4.0000°/minute

Sampling width: 0.0200°

Scanning axis: 2 θ/θ

Scanning range: 10.0000° to 40.0000°

The toner particle is placed on the sample plate and the measurement is begun.

The X-ray diffraction spectrum is obtained using characteristic CuKα X-rays, 0 for the Bragg angle, 2 θ for the diffraction angle, 2 θ in the range from 3° to 60°, the diffraction angle 2 θ for the horizontal axis, and the X-ray intensity for the vertical axis.

Peaks corresponding to the pigment at 2 θ=5°±0.5°, 20 = 14°±0.5°, 25° ±0.5°, and 2 θ=27°±0.5° are checked. The crystallite diameter D is calculated from the peak at 2 θ=27°±0.5° using the following equation and using the Scherrer constant (K), the X-ray wavelength employed (γ), the full width at half maximum ((β), and the Bragg angle θ.

$$D=K\times\lambda/(\beta\times\cos\theta)$$

Method for Monomer Determination (1) Method for Separating the Various Materials from the Toner The various materials can be separated from the toner utilizing differences in solubility in solvent of the various materials contained in the toner.

First separation: the toner is dissolved in methyl ethyl ketone (MEK) at 23° C. to effect separation into soluble matter (binder resin) and insoluble matter (e.g., the polymer C, release agent, pigment).

Second separation: the insoluble matter (e.g., the polymer C, release agent, pigment) yielded by the first separation is dissolved in MEK at 100° C. to effect separation into soluble matter (the polymer C, release agent) and insoluble matter (e.g., pigment).

Third separation: the soluble matter (the polymer C, release agent) yielded by the second separation is dissolved in chloroform at 23° C. to effect separation into soluble matter (the polymer C) and insoluble matter (release agent).

(2) Method for Determining the Monomer in the Binder Resin, the Polymer C, and the Pigment-bonded Resin Collected by the (Procedure 1) Described Above Structures are analyzed using a pyrolysis-gas chromatography-mass spectrometer (GC/MS), as follows. Herein 300 μg of the binder resin separated from toner, the Polymer C, or the solid fraction obtained in Procedure 1, is embedded in Pyrofoil F590 below, and the whole is introduced in a pyrolysis furnace, with heating at 590° C. for 5 seconds in an inert (helium) atmosphere; the decomposition gas generated as a result is thereupon introduced through the injection port of a gas chromatograph, and the oven profile below is then carried out. The column outlet is connected to an MS analyzer via a transfer line, and a total ion chromatogram (TIC) is achieved in which ion current is plotted on the vertical axis and retention time is plotted on the horizontal axis. A mass spectrum is extracted next for all peaks detected in the obtained chromatogram, using ancillary software, and compounds are attributed on the basis of the NIST-2017 database.

The measuring device and measuring conditions are as follows.

Pyrolysis furnace: Nippon Analytical Industry JSP900 (by Japan Analytical Industry Co., Ltd.)

Pyrofoil: F590 (by Nippon Analytical Industry Co., Ltd.)

GC: Agilent Technologies Inc. 7890A GC

MS: Agilent Technologies Inc. 5975C

Column: HP-5 ms 30 m, inner diameter 0.25 mm, mobile phase thickness 0.25 μm (by Agilent Technologies Inc.)

Carrier gas: He (purity of 99.9995% or higher)

Oven profile: (1) temperature held at 40° C. for 3 minutes, (2) warming up to 320° C. at 10° C./min, (3) temperature held at 320° C. for 20 minutes Inlet temperature: 280° C.

Split ratio: 50:1

Column flow rate: 1 mL/min (quantitative)

Transfer line temperature: 280° C.

Observation MS range: 30-600 Da

Ionization: EI 70 eV

Ion source temperature: 280° C.

Quadrupole temperature: 150° C.

EXAMPLES

The present invention is described in greater detail using examples and comparative examples, but these in no way limit the present invention. In the formulations given in the following, parts is on a mass basis unless specifically indicated otherwise.

Production Example for Binder Resin R1

Ethylene glycol: 27.3 parts

Terephthalic acid: 72.3 parts

Tin 2-ethylhexanoate (esterification catalyst): 0.5 parts

These materials were metered into a reactor fitted with a condenser, stirrer, nitrogen introduction line, and thermocouple. The interior of the reactor was substituted with nitrogen gas; the temperature was then gradually raised while stirring; and a reaction was run for 3 hours while stirring at a temperature of 140° C. The pressure in the reactor was then dropped to 8.3 kPa, the temperature was raised to 200° C. while stirring, and a reaction was run for 4 hours. The interior of the reactor was then again evacuated to 5 kPa or less and a reaction was run for 3 hours at 200° C. to obtain a binder resin R1.

Production Example for Binder Resins R2 to R10

Binder resins R2 to R10 were obtained using the same procedure as in the Production Example for Binder Resin R1, but changing the species of carboxylic acid and alcohol as shown in Table 1. Table 1 gives the SP value (SPA) and acid value of the binder resin that is produced and the number of carbons (a1) in the straight-chain aliphatic polyhydric alcohol that is a constituent component.

TABLE 1

| Binder resin | Alcohol component type | Alcohol component Number of parts | Carboxylic acid component type | Carboxylic acid component Number of parts | a1 | $SP_A$ | Acid value of binder resin mgKOH/g |
|---|---|---|---|---|---|---|---|
| R1 | Ethylene glycol | 27.4 | Terephthalic acid | 72.6 | 2 | 11.3 | 8.5 |
| R2 | 1,5-pentanediol | 38.8 | Terephthalic acid | 61.2 | 5 | 11.0 | 8.5 |
| R3 | 1,6-hexanediol | 39.7 | Terephthalic acid | 60.3 | 6 | 10.9 | 8.4 |
| R4 | 1,10-decanediol | 51.5 | Terephthalic acid | 48.5 | 10 | 10.7 | 8.5 |
| R5 | 1,12-dodecanediol | 55.2 | Terephthalic acid | 44.8 | 12 | 10.6 | 8.6 |
| R6 | 1,6-hexanediol | 50.0 | Terephthalic acid | 50.0 | 6 | 10.9 | 0.55 |
| R7 | 1,6-hexanediol | 30.1 | Terephthalic acid | 69.9 | 6 | 10.9 | 28 |
| R8 | 1,6-hexanediol | 52.0 | Terephthalic acid | 48.0 | 6 | 10.9 | 0.2 |
| R9 | 1,6-hexanediol | 29.5 | Terephthalic acid | 70.5 | 6 | 10.9 | 32 |
| R10 | BPA-PO | 67.6 | Terephthalic acid | 32.4 | — | 10.9 | 0.4 |

In the table, the unit for $SP_A$ is $(J/cm^3)^{0.5}$. BPA-PO is the adduct of propylene oxide (2.2 moles) on bisphenol A.

Production Example for Polymer C1

Ethane-1,1,2-triol: 9.0 parts

Ethylene glycol: 28.8 parts

Dodecanedioic acid: 62.2 parts

Tin 2-ethylhexanoate (esterification catalyst): 0.5 parts

These materials were metered into a reactor fitted with a condenser, stirrer, nitrogen introduction line, and thermocouple. The interior of the reactor was substituted with nitrogen gas; the temperature was then gradually raised while stirring; and a reaction was run for 3 hours while stirring at a temperature of 140° C. The pressure in the reactor was then dropped to 8.3 kPa, the temperature was raised to 200° C. while stirring, and a reaction was run for 1 hour to obtain a polymer C1, which was a crystalline polyester.

Production Example for Polymers C2 to C19

Polymers C2 to C19 were obtained using the same procedure as in the Production Example for Polymer C1, but changing the conditions as appropriate such that the aliphatic dicarboxylic acid and aliphatic diol were as indicated in Table 2. Polymers C8 to C13 were produced by varying the conditions as appropriate to give the weight-average molecular weights Mw given in Table 2. Table 2 gives the SP value ($SP_B$) and Mw for the resulting polymer C and the number of carbons (c1) in the straight-chain aliphatic polyhydric alcohol that is a constituent component, and also gives the functionality number for the alcohol constituting the polymer C.

TABLE 2

| Polymer C | Alcohol component type | Alcohol component parts | Alcohol component type | Alcohol component parts | Carboxylic acid component type | Carboxylic acid component parts | c1 | FN | $SP_B$ | Mw of polymer C |
|---|---|---|---|---|---|---|---|---|---|---|
| C1 | Ethane-1,1,2-triol | 9.0 | Ethylene glycol | 28.8 | Dodecanedioic acid | 62.2 | 2 | 3, 2 | 9.6 | 19000 |
| C2 | Ethylene glycol | 21.2 | — | — | Dodecanedioic acid | 78.8 | 2 | 2 | 9.5 | 19200 |
| C3 | 1,6-hexanediol | 31.9 | — | — | Dodecanedioic acid | 68.1 | 6 | 2 | 9.4 | 19500 |
| C4 | 1,7-heptanediol | 36.4 | — | — | Dodecanedioic acid | 63.6 | 7 | 2 | 9.3 | 19520 |
| C5 | 1,10-decanediol | 43.1 | — | — | Dodecanedioic acid | 56.9 | 10 | 2 | 9.3 | 19590 |
| C6 | 1,12-dodecanediol | 46.8 | — | — | Dodecanedioic acid | 53.2 | 12 | 2 | 9.2 | 19630 |
| C7 | 1,5-pentanediol | 31.1 | — | — | Dodecanedioic acid | 68.9 | 5 | 2 | 9.4 | 19390 |
| C8 | 1,12-dodecanediol | 46.8 | — | — | Dodecanedioic acid | 53.2 | 12 | 2 | 9.3 | 38400 |
| C9 | 1,12-dodecanediol | 46.8 | — | — | Dodecanedioic acid | 53.2 | 12 | 2 | 9.3 | 4320 |
| C10 | 1,12-dodecanediol | 46.8 | — | — | Dodecanedioic acid | 53.2 | 12 | 2 | 9.3 | 6200 |
| C11 | 1,12-dodecanediol | 46.8 | — | — | Dodecanedioic acid | 53.2 | 12 | 2 | 9.3 | 26000 |
| C12 | 1,12-dodecanediol | 46.8 | — | — | Dodecanedioic acid | 53.2 | 12 | 2 | 9.3 | 5700 |
| C13 | 1,12-dodecanediol | 46.8 | — | — | Dodecanedioic acid | 53.2 | 12 | 2 | 9.3 | 28600 |
| C14 | 1,15-pentadecanediol | 51.4 | — | — | Dodecanedioic acid | 48.6 | 15 | 2 | 9.1 | 28800 |
| C15 | Ethylene glycol | 21.2 | — | — | Dodecanedioic acid | 78.8 | 2 | 2 | 9.8 | 28700 |
| C16 | 1,17-heptadecanediol | 65.0 | — | — | Dodecanedioic acid | 35.0 | 17 | 2 | 8.7 | 28900 |
| C17 | Ethylene glycol | 21.2 | — | — | Adipic acid | 78.8 | 2 | 2 | 10.2 | 28500 |
| C18 | 1,20-eicosanediol | 65.0 | — | — | Dodecanedioic acid | 35.0 | 20 | 2 | 8.3 | 28800 |
| C19 | 1,20-eicosanediol | 65.4 | — | — | Terephthalic acid | 34.6 | 20 | 2 | 8.8 | 29300 |

In the table, the unit for $SP_B$ is $(J/cm^3)^{0.5}$. "FN" indicates "Functionality number of the alcohol constituting polymer C".

Production Example for Toner 1

Binder resin R1: 100 parts

Polymer C1: 8.0 parts

Release agent 1: 7.0 parts (hydrocarbon wax, peak temperature of maximum endothermic peak =90° C.)

Colorant 1 (C. I. Pigment Red PR-122): 10.0 parts

These materials were mixed using a Henschel mixer (Model FM-75, Mitsui Mining Co., Ltd.) at a rotation rate of 20 $s^{-1}$ for a rotation time of 5 minutes, followed by kneading using a twin-screw kneader (Model PCM-30, Ikegai Corporation). The resulting kneadate was cooled and coarsely pulverized to a volume-average particle diameter of 100 μm and below using a pin mill to obtain a coarsely pulverized material.

The obtained coarsely pulverized material was finely pulverized using a mechanical pulverizer (T-250, Turbo Kogyo Co., Ltd.) with adjustment of the rotation rate and number of passes so as to provide the target particle diameter. Classification was performed using a rotational classifier (200TSP, Hosokawa Micron Corporation) to obtain a toner particle. With regard to the operating conditions for the rotational classifier (200TSP, Hosokawa Micron Corporation), classification was performed with adjustment of the rotation rate so as to obtain the target particle diameter and particle size distribution.

To 100 parts of the obtained toner particle was added 1.8 parts of silica fine particles that had a specific surface area as measured by the BET method of 200 $m^2/g$ and that had been subjected to a hydrophobic treatment with silicone oil, and mixing was carried out using a Henschel mixer (Model FM-75, Mitsui Mining Co., Ltd.) at a rotation rate of 30 $s^{-1}$ for a rotation time of 10 minutes to give a toner 1. The weight-average particle diameter of toner 1 was 6.5 μm. In toner 1, it was confirmed that at least a portion of the polymer C and at least a portion of the pigment were bonded by the above-described confirmation method.

Toners 2 to 29 and Comparative Toners 1 to 4 Production Example

Toners 2 to 29 and Comparative Examples 1 to 4 were obtained proceeding as in the Production Example for Toner 1, but changing the binder resin, the polymer C, the release agent, and the colorant as shown in Table 3. Also in Toners 2 to 29 and Comparative Toners 1 to 4, it was confirmed that at least a portion of the polymer C and at least a portion of the pigment were bonded by the above-described confirmation method.

Pigments 2 to 5 are a known organic pigment (C. I. PR-122) and have a spectrum yielded by X-ray diffraction measurement that exhibits a peak at 2 θ=27°±0.5° where θ is the Bragg angle, and are organic pigments having respectively different crystallite diameters D for the crystals assigned to 2 θ=27°±0.5° where θ is the Bragg angle.

TABLE 3

| Example | Toner | Binder resin | | Polymer | | Release agent | | Colorant | |
|---|---|---|---|---|---|---|---|---|---|
| No. | No. | No. | parts | No. | parts | No. | parts | No. | parts |
| 1 | 1 | R1 | 100 | C1 | 8 | Release agent 1 | 7 | Colorant 1 (C.I. PR-122) | 10 |
| 2 | 2 | R1 | 100 | C1 | 3 | Release agent 1 | 7 | Colorant 1 (C.I. PR-122) | 10 |
| 3 | 3 | R1 | 100 | C1 | 20 | Release agent 1 | 7 | Colorant 1 (C.I. PR-122) | 10 |
| 4 | 4 | R1 | 100 | C1 | 1 | Release agent 1 | 7 | Colorant 1 (C.I. PR-122) | 10 |
| 5 | 5 | R1 | 100 | C1 | 25 | Release agent 1 | 7 | Colorant 1 (C.I. PR-122) | 10 |
| 6 | 6 | R1 | 100 | C2 | 8 | Release agent 1 | 7 | Colorant 1 (C.I. PR-122) | 10 |
| 7 | 7 | R1 | 100 | C3 | 8 | Release agent 1 | 7 | Colorant 1 (C.I. PR-122) | 10 |
| 8 | 8 | R1 | 100 | C4 | 8 | Release agent 1 | 7 | Colorant 1 (C.I. PR-122) | 10 |
| 9 | 9 | R2 | 100 | C5 | 8 | Release agent 1 | 7 | Colorant 1 (C.I. PR-122) | 10 |
| 10 | 10 | R3 | 100 | C6 | 8 | Release agent 1 | 7 | Colorant 1 (C.I. PR-122) | 10 |
| 11 | 11 | R4 | 100 | C7 | 8 | Release agent 1 | 7 | Colorant 1 (C.I. PR-122) | 10 |
| 12 | 12 | R5 | 100 | C3 | 8 | Release agent 1 | 7 | Colorant 1 (C.I. PR-122) | 10 |
| 13 | 13 | R3 | 100 | C8 | 8 | Release agent 1 | 7 | Colorant 1 (C.I. PR-122) | 10 |
| 14 | 14 | R3 | 100 | C9 | 8 | Release agent 1 | 7 | Colorant 1 (C.I. PR-122) | 10 |
| 15 | 15 | R3 | 100 | C6 | 8 | Release agent 1 | 7 | Colorant 2 (C.I. PR-122) | 10 |
| 16 | 16 | R3 | 100 | C6 | 8 | Release agent 1 | 7 | Colorant 3 (C.I. PR-122) | 10 |
| 17 | 17 | R3 | 100 | C6 | 8 | Release agent 1 | 7 | Colorant 4 (C.I. PR-122) | 10 |
| 18 | 18 | R3 | 100 | C6 | 8 | Release agent 1 | 7 | Colorant 5 (C.I. PR-122) | 10 |
| 19 | 19 | R3 | 100 | C10 | 8 | Release agent 1 | 7 | Colorant 1 (C.I. PR-122) | 10 |
| 20 | 20 | R3 | 100 | C11 | 8 | Release agent 1 | 7 | Colorant 1 (C.I. PR-122) | 10 |
| 21 | 21 | R3 | 100 | C12 | 8 | Release agent 1 | 7 | Colorant 1 (C.I. PR-122) | 10 |
| 22 | 22 | R3 | 100 | C13 | 8 | Release agent 1 | 7 | Colorant 1 (C.I. PR-122) | 10 |
| 23 | 23 | R 6 | 100 | C13 | 8 | Release agent 1 | 7 | Colorant 1 (C.I. PR-122) | 10 |
| 24 | 24 | R 7 | 100 | C13 | 8 | Release agent 1 | 7 | Colorant 1 (C.I. PR-122) | 10 |
| 25 | 25 | R 8 | 100 | C13 | 8 | Release agent 1 | 7 | Colorant 1 (C.I. PR-122) | 10 |
| 26 | 26 | R 9 | 100 | C13 | 8 | Release agent 1 | 7 | Colorant 1 (C.I. PR-122) | 10 |
| 27 | 27 | R 8 | 100 | C14 | 8 | Release agent 1 | 7 | Colorant 1 (C.I. PR-122) | 10 |
| 28 | 28 | R 8 | 100 | C15 | 8 | Release agent 1 | 7 | Colorant 1 (C.I. PR-122) | 10 |
| 29 | 29 | R 8 | 100 | C16 | 8 | Release agent 1 | 7 | Colorant 1 (C.I. PR-122) | 10 |
| C.E. 1 | C. 1 | R 8 | 100 | C17 | 8 | Release agent 1 | 7 | Colorant 1 (C.I. PR-122) | 10 |
| C.E. 2 | C. 2 | R10 | 100 | C18 | 8 | Release agent 1 | 7 | Colorant 1 (C.I. PR-122) | 10 |
| C.E. 3 | C. 3 | R10 | 100 | C19 | 8 | Release agent 1 | 7 | Colorant 1 (C.I. PR-122) | 10 |
| C.E. 4 | C. 4 | R10 | 100 | C13 | 8 | Release agent 1 | 7 | Colorant 1 (C.I. PR-122) | 10 |

In the Table 3, "C.E." indicates "Comparative example", and "C." indicates "Comparative".

D is the crystallite size, as determined by X-ray diffraction measurement, of the crystals assigned to 2 θ=27°±0.5° where θ is the Bragg angle. W is the resin content, per 100 mass parts of the organic pigment, in the solid fraction collected using the previously described (Procedure 1). Table 4 gives the numerical values of D, W, the relaxation time T2 in solid-state NMR measurement, the difference between a1 and c1,$SP_A$–$SP_B$, and Mw/D. The difference between a1 and c1 is the absolute value of the difference between the number of carbons in the straight-chain aliphatic polyhydric alcohol al and the number of carbons in the straight-chain aliphatic polyhydric alcohol cl.

TABLE 4

| Example No. | Toner No. | Solid-state NMR measurement Relaxation time T2 m s | Difference between a1 and c1 | $SP_A$-$SP_B$ $(J/cm^3)^{0.5}$ | Pigment D (2θ = 27° C.) nm | Polymer W parts | Mw/D/ nm |
|---|---|---|---|---|---|---|---|
| 1 | 1 | 12.0 | 0 | 1.7 | 16 | 7 | 1187.5 |
| 2 | 2 | 6.0 | 0 | 1.7 | 16 | 4 | 1187.5 |
| 3 | 3 | 18.0 | 0 | 1.7 | 16 | 47 | 1187.5 |
| 4 | 4 | 5.0 | 0 | 1.7 | 16 | 2 | 1187.5 |
| 5 | 5 | 20.0 | 0 | 1.7 | 16 | 53 | 1187.5 |
| 6 | 6 | 11.0 | 0 | 1.8 | 16 | 2 | 1200.0 |
| 7 | 7 | 11.0 | 4 | 1.9 | 16 | 2 | 1218.8 |
| 8 | 8 | 13.0 | 5 | 1.9 | 16 | 2 | 1220.0 |
| 9 | 9 | 8.0 | 5 | 1.7 | 16 | 2 | 1224.4 |
| 10 | 10 | 9.0 | 6 | 1.7 | 16 | 2 | 1226.9 |
| 11 | 11 | 12.0 | 5 | 1.3 | 16 | 2 | 1211.9 |
| 12 | 12 | 11.0 | 6 | 1.2 | 16 | 2 | 1218.8 |
| 13 | 13 | 9.0 | 6 | 1.6 | 16 | 2 | 2400.0 |
| 14 | 14 | 7.0 | 6 | 1.6 | 16 | 2 | 270.0 |
| 15 | 15 | 12.0 | 6 | 1.7 | 13 | 2 | 1510.0 |
| 16 | 16 | 12.0 | 6 | 1.7 | 18 | 2 | 1090.6 |
| 17 | 17 | 11.0 | 6 | 1.7 | 10 | 2 | 1963.0 |
| 18 | 18 | 12.0 | 6 | 1.7 | 24 | 2 | 817.9 |
| 19 | 19 | 9.0 | 6 | 1.6 | 16 | 2 | 387.5 |
| 20 | 20 | 15.0 | 6 | 1.6 | 16 | 2 | 1625.0 |
| 21 | 21 | 10.0 | 6 | 1.6 | 16 | 2 | 356.25 |
| 22 | 22 | 16.0 | 6 | 1.6 | 16 | 2 | 1787.5 |
| 23 | 23 | 17.0 | 6 | 1.6 | 10 | 2 | 2860.0 |
| 24 | 24 | 16.0 | 6 | 1.6 | 10 | 2 | 2860.0 |
| 25 | 25 | 15.0 | 6 | 1.6 | 10 | 2 | 2860.0 |
| 26 | 26 | 16.0 | 6 | 1.6 | 10 | 2 | 2860.0 |
| 27 | 27 | 16.0 | 9 | 1.8 | 10 | 2 | 2880.0 |
| 28 | 28 | 14.0 | 4 | 1.1 | 10 | 2 | 2870.0 |
| 29 | 29 | 12.0 | 11 | 2.2 | 10 | 2 | 2890.0 |
| C.E. 1 | C. 1 | 13.0 | 4 | 0.7 | 10 | 2 | 2850.0 |
| C.E. 2 | C. 2 | 11.0 | — | 2.6 | 10 | 2 | 2880.0 |
| C.E. 3 | C. 3 | 0.5 | — | 2.1 | 10 | 2 | 2930.0 |
| C.E. 4 | C. 4 | 56.0 | — | 1.6 | 10 | 2 | 2860.0 |

In the Table 4, "C.E." indicates "Comparative example", and "C." indicates "Comparative".

Production Example of Magnetic Carrier 1

Magnetite 1 with a number average particle diameter of 0.30 μm (magnetization strength of 65 Am2/kg under a magnetic field of 1000/4 π (kA/m))

Magnetite 2 with a number average particle diameter of 0.50 μm (magnetization strength of 65 Am2/kg under a magnetic field of 1000/4 π (kA/m))

Fine particles of each type were treated by adding 4.0 parts of a silane compound (3-(2-aminoethylaminopropyl) trimethoxysilane) to 100 parts of each of the above materials and high-speed mixing and stirring in a container at 100° C. or higher.

Phenol: 10% by mass

Formaldehyde solution: 6% by mass (formaldehyde 40% by mass, methanol 10% by mass, water 50% by mass)

Magnetite 1 treated with the above silane compound: 58% by mass

Magnetite 2 treated with the above silane compound: 26% by mass

A total of 100 parts of the above materials, 5 parts of a 28% by mass aqueous ammonia solution, and 20 parts of water were placed in a flask, heated to 85° C. in 30 min while stirring and mixing, and held for 3 h for polymerization reaction to cure the produced phenolic resin. After that, the cured phenolic resin was cooled to 30° C., water was added, the supernatant was removed, and the precipitate was washed with water and air-dried. Next, this was dried at a temperature of 60° C. under reduced pressure (5 mmHg or less) to obtain a magnetic body-dispersed spherical magnetic carrier 1.

Production Example of Two-Component Developer 1

A total of 92.0 parts of the magnetic carrier 1 and 8.0 parts of the toner 1 were mixed with a V-type mixer (V-20, manufactured by Seishin Corporation) to obtain a two-component developer 1.

Production Example for Two-Component Developers 2 to 29 and Comparative Two-Component Developers 1 to 4

Two-component developers 2 to 29 and comparative two-component developers 1 to 4 were obtained using the same procedure as in the Production Example for Two-Component Developer 1, but implementing the changes as in Table 5.

TABLE 5

| Example No. | Developer No. | Toner No. | Magnetic carrier No. |
|---|---|---|---|
| 1 | Developer 1 | 1 | 1 |
| 2 | Developer 2 | 2 | 1 |
| 3 | Developer 3 | 3 | 1 |
| 4 | Developer 4 | 4 | 1 |
| 5 | Developer 5 | 5 | 1 |
| 6 | Developer 6 | 6 | 1 |
| 7 | Developer 7 | 7 | 1 |
| 8 | Developer 8 | 8 | 1 |
| 9 | Developer 9 | 9 | 1 |
| 10 | Developer 10 | 10 | 1 |
| 11 | Developer 11 | 11 | 1 |
| 12 | Developer 12 | 12 | 1 |
| 13 | Developer 13 | 13 | 1 |
| 14 | Developer 14 | 14 | 1 |
| 15 | Developer 15 | 15 | 1 |
| 16 | Developer 16 | 16 | 1 |
| 17 | Developer 17 | 17 | 1 |
| 18 | Developer 18 | 18 | 1 |
| 19 | Developer 19 | 19 | 1 |
| 20 | Developer 20 | 20 | 1 |
| 21 | Developer 21 | 21 | 1 |
| 22 | Developer 22 | 22 | 1 |
| 23 | Developer 23 | 23 | 1 |
| 24 | Developer 24 | 24 | 1 |
| 25 | Developer 25 | 25 | 1 |
| 26 | Developer 26 | 26 | 1 |
| 27 | Developer 27 | 27 | 1 |
| 28 | Developer 28 | 28 | 1 |
| 29 | Developer 29 | 29 | 1 |
| C.E. 1 | C. developer 1 | C. 1 | 1 |
| C.E. 2 | C. developer 2 | C. 2 | 1 |
| C.E. 3 | C. developer 3 | C. 3 | 1 |
| C.E. 4 | C. developer 4 | C. 4 | 1 |

In the Table 5, "C.E." indicates "Comparative example", and "C." indicates "Comparative".

An imageRUNNER ADVANCE C9075 PRO, a digital printer for commercial printing from Canon, Inc., was used in a modified form as the image-forming machine. The two-component developer was introduced into the developing device at the magenta position; the direct current voltage VDC of the developer carrying member, the charging voltage VD of the electrostatic latent image bearing member, and the laser power were adjusted so as to provide the desired toner laid-on level on the electrostatic latent image bearing member or the paper; and the following evaluations were performed. The modifications were alterations that enabled the fixation temperature and process speed to be freely set.

The in-plane density uniformity, tinting strength, and charge retention were evaluated using two-component developers 1 to 29 and comparative two-component developers 1 to 4.

Test Example 1

Method for Evaluating the In-Plane Density Uniformity

The evaluation environment was 20° C./8% RH. A plain copy paper (trade name: GFC-081, A4 paper, areal weight: 81.4 g/m2, sold by Canon Marketing Japan Inc.) was used for the paper used in the evaluation.

The image in-plane density uniformity was evaluated proceeding as follows. First, the formation of a solid line image with a density of 1.8 was carried out using a vertical width [A4 portrait feed, 4 vertical bands were formed in the image] image with a width of 30 mm formed at a 50 mm pitch in the longitudinal direction. The longitudinal density distribution of the back end of the image was evaluated at this time. The range of the density non-uniformity of the obtained image was converted into a numerical value. Specifically, the longitudinal density distribution was evaluated by measuring the image density at 10 randomly selected points in the central 70 mm range of the back end of the image. The difference between the maximum value and minimum value of the density was determined from the obtained longitudinal density distribution to give the density difference for the range of the density non-uniformity. A small density difference (in-plane density difference) for this range can be considered as indicating a good in-plane uniformity for the density and the absence of density non-uniformity.

The image density was measured using an X-Rite color reflection densitometer (500 Series, X-Rite, Incorporated). The results of the evaluation are given in Table 6. Evaluation Criteria A: the in-plane density difference is less than 0.02

B: the in-plane density difference is at least 0.02, but less than 0.07

C: the in-plane density difference is at least 0.07, but less than 0.10

D: the in-plane density difference is at least 0.10

Test Example 2

Method for Evaluating the Tinting Strength of the Toner

A normal-temperature, normal-humidity environment (23° C., 50% RH) was used for the evaluation environment, and CS-068 plain copy paper (A4 paper, areal weight=68 g/m2, sold by Canon Marketing Japan Inc.) was used for the paper used in the evaluation.

First, while operating in the aforementioned evaluation environment, image output was performed in a constant state with the developing bias having an AC component with an amplitude of 1000 V and a frequency of 9 kHz and with the DC component set to −350 V versus a light potential for the photosensitive drum of —200 V and a dark potential of −500 V, and the image density of the output image was then checked. The settings are not limited to the configuration in this example, and these settings are an example. The image density was measured using an X-Rite color reflection densitometer (500 Series, X-Rite, Incorporated). The tinting strength of the toner was evaluated using the following criteria and the results provided by the X-Rite color reflection densitometer. The results of the evaluation are given in Table 6.

Evaluation Criteria

A: equal to or greater than 1.30

B: equal to or greater than 1.25, but less than 1.30

C: equal to or greater than 1.20, but less than 1.25

D: less than 1.20

Test Example 3

Method for Evaluating the Charge Retention

Paper: GFC-081 (81.0 g/m$^2$) (Canon Marketing Japan Inc.)

Toner laid-on level on the paper: 0.35 mg/cm$^2$ (adjusted using the direct current voltage VDC of the developer carrying member, the charging voltage VD of the electrostatic latent image bearing member, and the laser power)

Evaluation image: a 2 cm×5 cm image positioned in the center of the A4 paper specified above Fixing test environment: high-temperature, high-humidity environment: 30° C. temperature/humidity 80% RH ("H/H" below)

Process speed: 377 mm/sec

The triboelectric charge quantity on the toner was calculated by carrying out suction collection of the toner on the electrostatic latent image bearing member using a metal cylindrical tube and a cylindrical filter.

Specifically, the triboelectric charge quantity on the toner on the electrostatic latent image bearing member was measured using a Faraday cage. A Faraday cage is a coaxial double cylinder wherein the inner cylinder is insulated from the outer cylinder. When a charged body carrying a charge quantity Q is introduced into this inner cylinder, due to electrostatic induction this is the same as the presence of a metal cylinder carrying charge quantity Q. This induced charge quantity was measured with an electrometer (Keithley 6517A, Keithley Instruments, Inc.), and the charge quantity Q (mC) divided by the mass M (kg) of the toner in the inner cylinder, or Q/M, was taken to be the triboelectric charge quantity of the toner.

Triboelectric charge quantity of the toner (mC/kg)=Q/M

First, the aforementioned evaluation image was formed on the electrostatic latent image bearing member; the rotation of the electrostatic latent image bearing member was stopped prior to transfer to the intermediate transfer member; and the toner on the electrostatic latent image bearing member was suctioned off and collected using the cylindrical metal tube and cylindrical filter and the [initial Q/M] was measured.

Then, after standing for 2 weeks in the H/H environment with the developing device continuing to be installed in the evaluation machine, the same procedure as prior to holding was carried out and the charge quantity Q/M (mC/kg) per unit mass on the electrostatic latent image bearing member post-holding was measured. Using 100% for the aforementioned initial Q/M per unit mass on the electrostatic latent image bearing member, the retention ratio for the Q/M per unit mass on the electrostatic latent image bearing member post-holding was calculated ([post-holding Q/M]/[initial Q/M]×100) and was assessed using the following criteria. The results of the evaluation are given in Table 6.

Evaluation Criteria

A: the retention ratio is at least 95%

B: the retention ratio is at least 90%, but less than 95%

C: the retention ratio is at least 85%, but less than 90%

D: the retention ratio is at least 80%, but less than 85%

E: the retention ratio is less than 80%

TABLE 6

| Example No. | Developer No. | Test example 1 In-plane density uniformity | Rank | Test example 2 Tinting strength | Rank | Test example 3 Charge retention | Rank |
|---|---|---|---|---|---|---|---|
| 1 | 1 | 0.01 | A | 1.34 | A | 96 | A |
| 2 | 2 | 0.07 | C | 1.21 | C | 97 | A |
| 3 | 3 | 0.01 | A | 1.32 | A | 86 | C |
| 4 | 4 | 0.05 | B | 1.22 | C | 97 | A |
| 5 | 5 | 0.01 | A | 1.32 | A | 85 | C |
| 6 | 6 | 0.04 | B | 1.27 | B | 95 | A |
| 7 | 7 | 0.05 | B | 1.25 | B | 94 | B |
| 8 | 8 | 0.05 | B | 1.26 | B | 92 | B |
| 9 | 9 | 0.06 | B | 1.28 | B | 93 | B |
| 10 | 10 | 0.06 | B | 1.27 | B | 92 | B |
| 11 | 11 | 0.06 | B | 1.25 | B | 92 | B |
| 12 | 12 | 0.06 | B | 1.26 | B | 90 | B |
| 13 | 13 | 0.06 | B | 1.25 | B | 91 | B |
| 14 | 14 | 0.07 | C | 1.25 | B | 90 | B |
| 15 | 15 | 0.07 | C | 1.24 | C | 90 | B |
| 16 | 16 | 0.07 | C | 1.24 | C | 89 | C |
| 17 | 17 | 0.07 | C | 1.23 | C | 88 | C |
| 18 | 18 | 0.08 | C | 1.24 | C | 87 | C |
| 19 | 19 | 0.07 | C | 1.23 | C | 88 | C |
| 20 | 20 | 0.07 | C | 1.22 | C | 88 | C |
| 21 | 21 | 0.08 | C | 1.20 | C | 86 | C |
| 22 | 22 | 0.09 | C | 1.20 | C | 85 | C |
| 23 | 23 | 0.08 | C | 1.20 | C | 86 | C |
| 24 | 24 | 0.08 | C | 1.20 | C | 85 | C |
| 25 | 25 | 0.08 | C | 1.21 | C | 83 | D |
| 26 | 26 | 0.09 | C | 1.20 | C | 81 | D |
| 27 | 27 | 0.08 | C | 1.20 | C | 81 | D |
| 28 | 28 | 0.07 | C | 1.20 | C | 81 | D |
| 29 | 29 | 0.09 | C | 1.20 | C | 80 | D |
| C.E. 1 | C. 1 | 0.07 | C | 1.22 | C | 77 | E |
| C.E. 2 | C. 2 | 0.05 | B | 1.19 | D | 85 | C |
| C.E. 3 | C. 3 | 0.12 | D | 1.15 | D | 93 | B |
| C.E. 4 | C. 4 | 0.06 | B | 1.26 | B | 73 | E |

In the Table 6, "C.E." indicates "Comparative example", and "C." indicates "Comparative".

With reference to Comparative Example 1, the difference in the SP values of the binder resin and the polymer C constituting the toner, i.e., $SP_A-SP_B$, is 0.7. The resin bonded to the pigment is shown to have a high molecular mobility based on the value of the transverse relaxation time T2 in solid-state NMR. In this case, it is hypothesized that the resin bonded to the pigment has an excellent compatibility or miscibility with the binder resin, and that as a consequence the molecular mobility in the binder resin of the resin bonded to the pigment is quite high and the charge retention assumes an unacceptable level.

With reference to Comparative Example 2, the value of $SP_A-SP_B$ is high at 2.6 and the compatibility or miscibility of the resin bonded to the pigment with the binder resin is impaired and aggregation of the resin-bonded pigment readily occurs. It is thought that as a result the tinting strength assumes an unacceptable level.

With reference to Comparative Example 3, the resin bonded to the pigment is shown to have a quite low molecular mobility based on the value of the transverse relaxation time T2 in solid-state NMR. It is thus hypothesized that the mobility of the resin-bonded pigment in the toner is impaired, the pigment dispersion post-fixing is reduced, and the in-plane density non-uniformity assumes an unacceptable level.

With reference to Comparative Example 4, the molecular mobility is quite high based on the value of the transverse relaxation time T2 in solid-state NMR. This is thought to be due to the resin bonded to the pigment. It is hypothesized that, due to the excessively high molecular mobility, charge leakage in the charged toner is promoted and the charge retention then declines.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-057354, filed Mar. 30, 2022, and Japanese Patent Application No. 2023-029193, filed Feb. 28, 2023, which are hereby incorporated by reference herein in their entirety.

What is claimed is:

1. A toner, comprising:

a toner particle comprising a binder resin, a polymer C and a pigment;

the binder resin being an amorphous polyester resin;

polymer C being a crystalline polyester resin;

the pigment comprising a quinacridone pigment;

at least a portion of polymer C is bonded with at least a portion of the pigment;

the toner has a peak corresponding to the pigment at 2 $\theta=27°\pm0.5°$ in x-rag diffraction measurement of the toner where θ is Bragg angle and 2θ is diffraction angle, and a crystallite diameter D for a crystal corresponding to the peak at 2 $\theta=27°\pm0.5°$ is 12 to 20 nm; and $300.0\leq Mw/D<2000.0$ when Mw is a weight-average molecular weight of polymer C, wherein in solid-state NMR measurement at 60° C. using a solid fraction collected according to Procedure for a sample, transverse relaxation time T2 of a peak observed at 1.5 to 2.5 ppm is 1.0 to 50.0 ms, and $1.0<SP_A+SP_B\leq2.4$ when $SP_A(J/cm^3)^{0.5}$ is a SP value of the binder resin and $SP_B(J/cm^3)^{0.5}$ is a SP value of polymer C, Procedure a sucrose concentrate is prepared by adding 160 g of sucrose to 100 mL of deionized water and dissolving while heating on a water bath and a dispersion is prepared by introducing 31 g of the sucrose concentrate and 6 mL of a 10 mass % aqueous solution of a neutral pH 7 detergent comprising a nonionic surfactant, anionic surfactant and organic builder into a centrifugal separation tube, adding 2.0 g of the toner to the dispersion, and breaking up any clumps of the toner with a spatula and shaking the centrifugal separation tube with a shaker followed by separating a sediment from the solution using a centrifugal separator under conditions of 3500 rpm, 30 minutes and a rotation radius of 3 cm, filtering a floating solid fraction with a vacuum filter and drying to obtain a solid fraction, dissolving 1 g of the solid fraction in 20 mL chloroform and performing centrifugal separation for 180 minutes at 15000 rpm and a rotation radius of 3 cm, discarding a supernatant, twice adding another 20 mL chloroform, performing said centrifugal separation and separating a sediment, filtering the sediment on a vacuum filter and drying an obtained solid fraction for at least 5 hours to obtain the sample.

2. The toner according to claim 1, wherein $$9.0\leq SP_B\leq10.0.$$

3. The toner according to claim 1, wherein the binder resin has an acid value of 0.5 to 30.0 mg KOH/g.

4. The toner according to claim 1, wherein polymer C has a weight-average molecular weight Mw of 6000 to 27000.

5. The toner according to claim 1, wherein the binder resin has a monomer unit provided by a C2-C10 straight-chain aliphatic polyhydric alcohol al that forms a skeleton of the amorphous polyester resin, polymer C has a monomer unit provided by a C2-C10 straight-chain aliphatic polyhydric alcohol cl that forms a skeleton of the crystalline polyester resin, and an absolute value of a difference between the number of carbons in the straight-chain aliphatic polyhydric alcohol a1 and the number of carbons in the straight- chain aliphatic polyhydric alcohol cl is not more than 4.

6. The toner according to claim 5, wherein polymer C has a monomer unit provided by an at least trihydric polyhydric alcohol that forms the skeleton of the crystalline polyester resin.

7. The toner according to claim 1, wherein a resin content in the solid fraction collected in Procedure is 3 to 50 mass parts per 100 mass parts of the pigment.

* * * * *